United States Patent [19]

Gregory et al.

[11] 4,080,911
[45] Mar. 28, 1978

[54] FERTILIZER DISTRIBUTOR ATTACHMENT FOR A TRANSPLANTER

[76] Inventors: C. Albert Gregory; R. Lane Gregory, both of Rte. 2, Angier, N.C. 27501

[21] Appl. No.: 741,883

[22] Filed: Nov. 15, 1976

[51] Int. Cl.² .................... A01C 5/00; G01F 13/00
[52] U.S. Cl. .................................. 111/36; 222/614; 222/235; 222/618; 222/623
[58] Field of Search .................. 111/2, 63, 3, 64, 83, 111/8, 9, 36, 85, 74, 77, 89, 90; 222/177, 235

[56] References Cited

U.S. PATENT DOCUMENTS

| | | | |
|---|---|---|---|
| 242,335 | 5/1881 | Lang | 111/9 |
| 411,470 | 9/1889 | Piland | 111/36 X |
| 1,104,602 | 7/1914 | Akers | 111/84 |
| 2,715,882 | 8/1955 | Overstreet, Jr. | 111/3 |
| 2,723,632 | 11/1955 | Rowland | 111/9 X |
| 2,838,017 | 6/1958 | Waldron, Jr. | 111/85 X |
| 3,411,467 | 11/1968 | Van der Lely et al. | 111/36 X |
| 3,453,977 | 7/1969 | Sorenson | 111/36 |
| 3,491,709 | 1/1970 | Fleischer et al. | 111/85 |
| 3,673,970 | 7/1972 | Hatcher | 111/85 |
| 3,797,418 | 3/1974 | Bridger, Jr. | 111/85 X |

FOREIGN PATENT DOCUMENTS

| | | | |
|---|---|---|---|
| 530,399 | 12/1940 | United Kingdom | 111/36 |
| 1,102,739 | 2/1968 | United Kingdom | 111/36 |

*Primary Examiner*—E. H. Eickholt
*Attorney, Agent, or Firm*—Mills & Coats

[57] ABSTRACT

The present invention relates to a fertilizer distributor attachment that is adapted to be mounted to a conventional transplanter and powered thereby through a frictional drive system that includes a friction drive wheel associated with said fertilizer distributor attachment and engageable with a furrow closing wheel assembly rotatively mounted to the transplanter and which engages the ground as the transplanter traverses a field during the transplanting operation.

4 Claims, 7 Drawing Figures

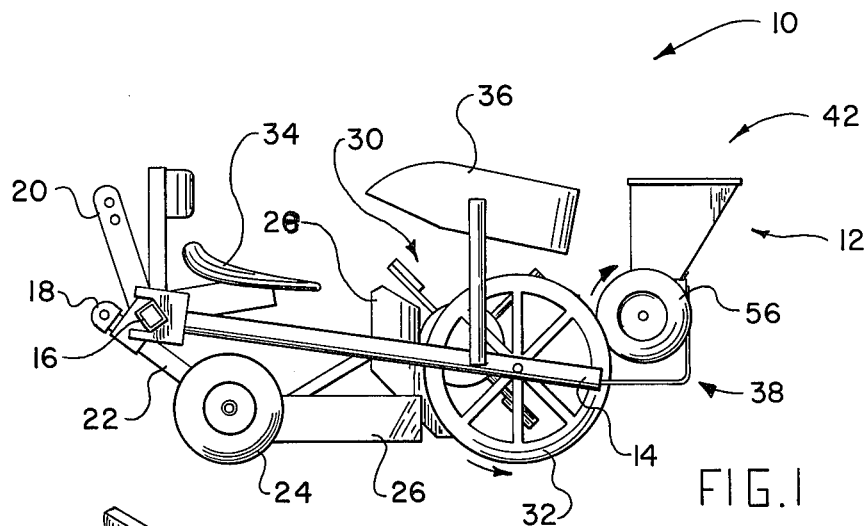
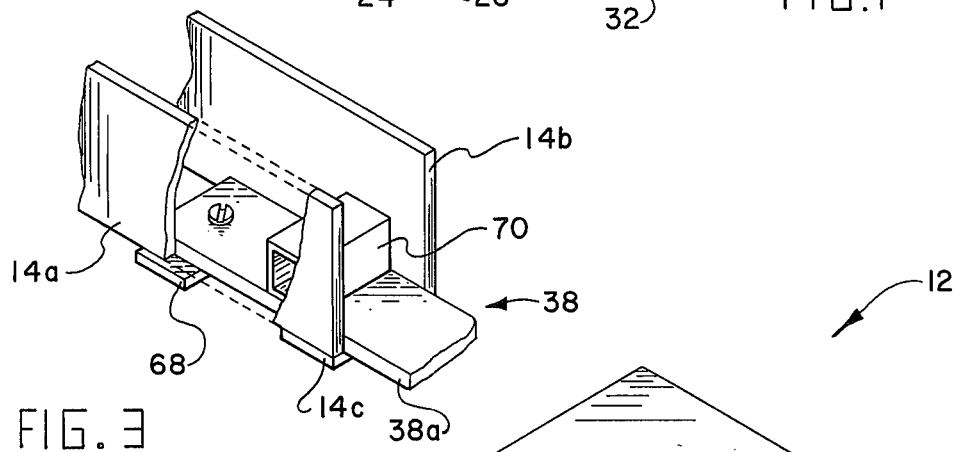
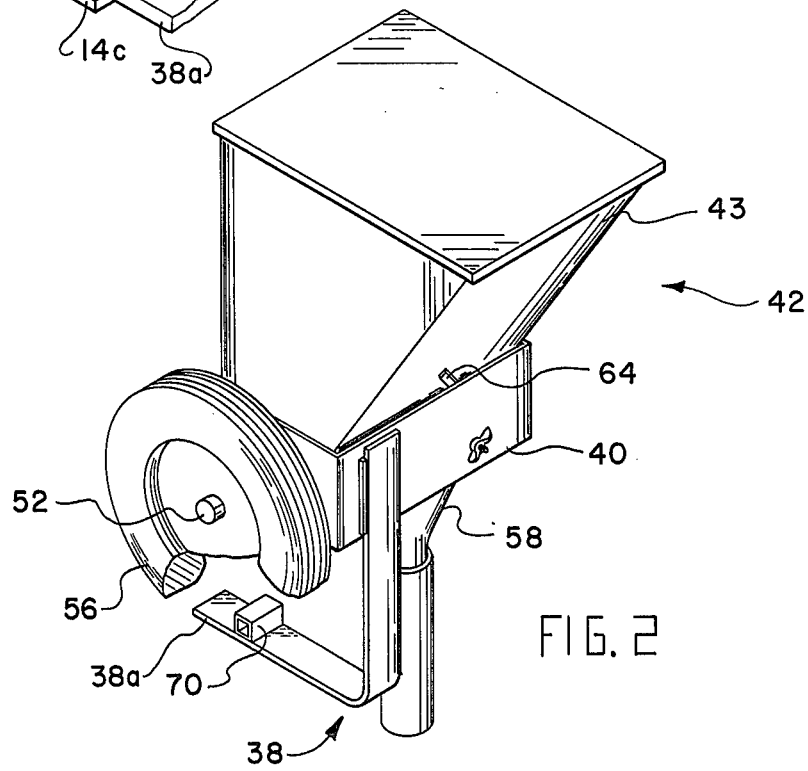

FERTILIZER DISTRIBUTOR ATTACHMENT FOR A TRANSPLANTER

The present invention relates to agricultural machinery and more particularly to a quick connect and disconnect frictional wheel drive fertilizer distributor attachment especially adapted for use in conjunction with mechanical transplanters.

BACKGROUND OF THE INVENTION

Today, immediately after field transplanting of a crop such as tobacco, it is common practice for the farmer, in another separate field operation, to add fertilizer or nitrate of soda to the just planted crop. This, of course, requires two separate field operations with the farm tractor and each requires a significant amount of labor not to mention the expenses involved that are associated with the cost of operating the tractor and the associated equipment during each field operation.

Fertilizer distributor attachments that operate to distribute fertilizer, soda or other plant growth material have in the past been provided with certain agricultural implements and have been adapted to operate in conjunction therewith. However, many such fertilizer distributor attachments have generally been relatively expensive, complex, heavy and bulky, and expensive and difficult to maintain. In addition, conventional fertilizer distributors of the type herein referred to generally include agitating means within the distributor hopper and some type of distributing control, both of which are generally driven. To accomplish this driving operation, the fertilizer distributor attachments in the past have employed various types of drive means, but perhaps the most common is the chain drive. Often when used in conjunction with a fertilizer distributor and an associated implement, such chain drives have been found in some cases to be unreliable and prone to break, run off sprockets, or malfunction in other ways that result in breakdowns and the necessity to repair the chain drive.

Also it is not always easy and convenient to locate an effective and efficient point on the associated implement or tractor from which to drive the fertilizer distributor at the desired speed. It is not uncommon for a typical chain drive assembly to include multiple chain link segments that may appear to form a maze of sprockets and jack shafts. Such complexity in order to provide a drive train that will yield a certain output speed for driving the fertilizer distributor often compounds the maintenance problems with such chain drive systems.

SUMMARY OF THE INVENTION

The present invention presents a relatively simple and inexpensive fertilizer distributor attachment adapted to be quickly and conveniently connected and disconnected about a conventional mechanical transplanter, allowing both the transplanting operation and initial fertilization or soda top dressing applications to be accomplished simultaneously in one single field operation, thereby avoiding dual field operation that are common practice with certain crops. In addition, the fertilizer distributor attachment of the present invention is particularly provided with a reliable-low maintenance friction wheel drive assembly that includes a drive wheel adapted when said fertilizer distributor is attached on said transplanter to engage and be driven by a furrow closing wheel means or assembly provided with the transplanter. The constant engagement of the friction drive wheel with the furrow closing wheel means of the transplanter results in driving torque being supplied to the fertilizer distributor attachment and this driving torque acts to drive an agitating assembly within the fertilizer distributor and a metering or stop sprocket that controls the flow of fertilizer or plant growth material from the fertilizer distributor attachment.

It is, therefore, an object of the present invention to provide a mechanical transplanter with a fertilizer distributor attachment in order that a transplanting operation and a fertilization (or side dressing) application can be performed simultaneously in one single field operation.

Another object of the present invention is to provide a fertilizer distributor attachment for a mechanical transplanter that is simple, reliable, and relatively inexpensive.

Another object of the present invention resides in the provision of a fertilizer distributor attachment for a transplanter that is provided with a friction wheel drive assembly that is cooperable with a ground engaging furrow closing wheel assembly of the transplanter for driving an agitating assembly and other driven elements of the fertilizer distributor as the transplanter traverses a field during the transplanting operation.

Still a further object of the present invention is to provide a fertilizer distributor attachment for a mechanical transplanter that may be easily connected and adapted to other agricultural implements such as a rolling type cultivator for use in applying fertilizer, soda, and other types of plant growth material, or even other material such as bud worm bait.

A further object of the present invention resides in the provision of a fertilizer distributor attachment for a mechanical transplanter that is particularly provided with a quick connecting frame means that connects to the transplanter's main frame and acts to support the fertilizer distributor in a sturdy operative posture about the transplanter.

A further object of the present invention resides in the provision of a fertilizer distributor attachment for a mechanical transplanter having a generally U-shaped main support frame structure of supporting a hopper assembly, the frictional drive assembly, and other related elements of the fertilizer distributor attachment.

Other objects and advantages of the present invention from a study of the following description and the accompanying drawings which are merely illustrative of the present invention.

BRIEF DESCRIPTION OF THE DRAWINGS

FIG. 1 is a side elevational view of a mechanical transplanter having the fertilizer distributor attachment of the present invention mounted thereon.

FIG. 2 is a perspective view of the fertilizer distributor attachment of the present invention.

FIG. 3 is a fragmentary perspective view illustrating the manner in which the fertilizer distributor attachment of the present invention connects to the main frame of the transplanter.

DESCRIPTION OF THE PREFERRED EMBODIMENT

Figure 4:
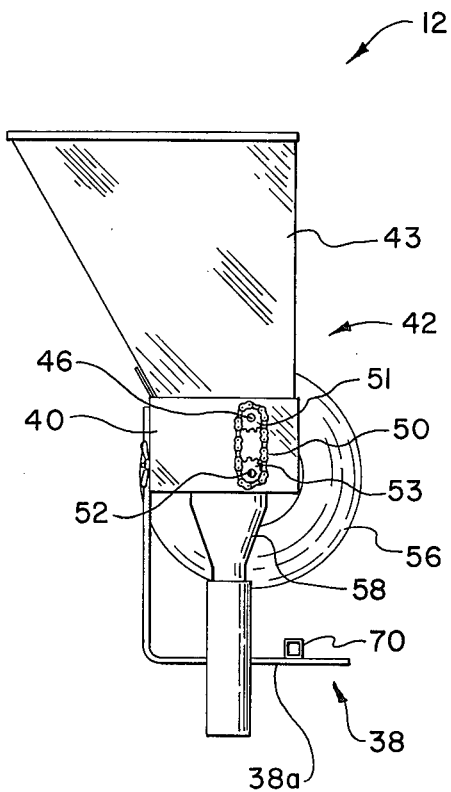
FIG. 4 is a side elevational view of the fertilizer distributor attachment of the present invention.
Figure 5:
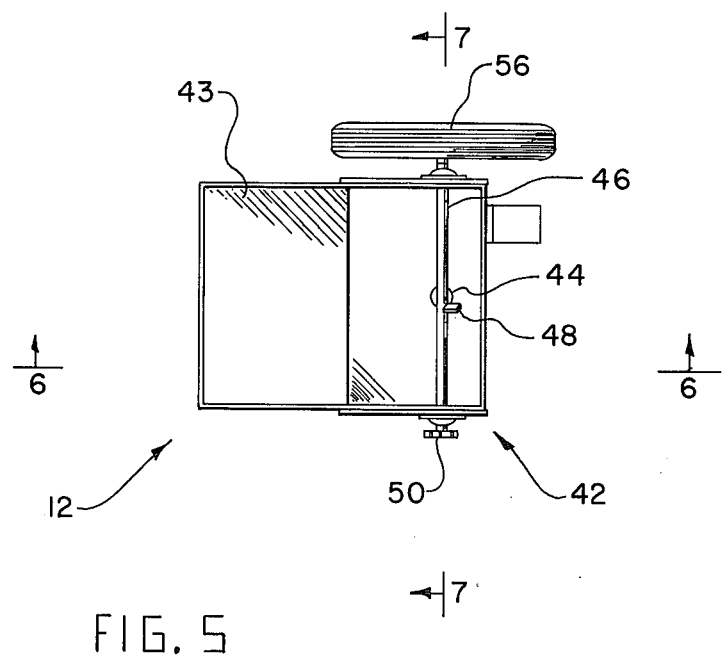
FIG. 5 is a top plan view of the fertilizer distributor attachment of the present invention.

With further reference to the drawings, particularly FIG. 1, a mechanical transplanter is shown therein and indicated generally by the numeral 10. Mounted on transplanter 10 is the fertilizer distributor assembly of the present invention, indicated generally by the numeral 12.

Before discussing fertilizer distributor attachment 12 in detail and its particular relationship with transplanter 10, it may be beneficial to briefly review the basic structure of transplanter 10. In this regard, transplanter 10 is of a conventional ferris wheel type mechanical transplanter that includes a main frame 14 having a transversely extending front tool bar 16 that is adapted to connect to a tractor's three-point hitch (not shown) by the provision of a pair of lower draft links 18 (only one of which is shown) and an upper center hitch 20, both of which are generally secured to tool bar 16 and extend forwardly therefrom. Secured to tool bar 16 and extending generally rearwardly therefrom are a plurality of laterally spaced wheel arms 22, each wheel arm having a wheel 24 rotatively mounted thereto. In operation, transplanter 10 is pulled through the field by a tractor and wheels 24 are ground engaging and act to generlly support transplanter 10.

Disposed forwardly beneath main frame 14 is a leveling blade 26 that functions to generally level the row prior to the actual transplanting operation. Disposed rearwardly of the effective area of leveling blade 26 is a furrow opening plow 28 that acts to form a furrow or cavity within the soil or row being planted during the transplanting operation. The formed furrow or cavity is formed to receive plants that are hand placed in any one of a number of plant receiving receptacles that form a part of a driven ferris wheel type planting assembly, indicated generally by the numeral 30 and rotatively driven by a chain drive or the like that is driven off a furrow closing wheel means or assembly 32 that is rotatively mounted to the transplanter main frame 14 and aligned with the furrow opening plow so as to generally close the furrow about each planted plant after the respective plants have been deposited and planted in the open furrow by the ferris wheel type planting assembly 30.

Disposed about the forward portion of main frame 14 is a plurality of seats 34 and facing each seat is a plant tray assembly 36 that is supported by the main frame such that the plant tray assembly is in easy reaching access of an individual when stationed on a respective seat 34.

It will be appreciated that transplanter 10 referred to above could be of the type designed to plant one row at a time, two rows at a time, or even more if desired. For each row planted, such conventional transplanters are designed to support two individuals, who during the planting operation alternate to place respective plants in each of the radial plant setting arms or receptacles of the ferris wheel plant setting assembly 30. The above is only a general discussion of the mechanical transplanter of the type adapted to be compatible with the fertilizer distributor attachment 12 of the present invention. A detail and specific discussion of the transplanter structure and function is not dealt with herein in detail because such details are not material to the invention per se, and the basic structure and operation of such mechanical transplanters is well appreciated by those skilled in the art.

Now turning to a discussion of the fertilizer distributor attachment 12, it is seen that the same includes a generally L-shaped mounting frame means, indicated generally by the numeral 38. The main frame means 38 in the embodiment illustrated in the drawings, includes a generally L-shaped member having a lower horizontal leg 38a that is adapted to be connected to the main frame 14 of transplanter 10. A more complete discussion of the manner of connecting the L-shaped mounting frame means will be forthcoming in this disclosure.

Secured to the upper portion of the mounting frame means 38, as viewed in FIGS. 1 and 2, by weldment or other suitable means is a generally U-shaped main support frame indicated by the numeral 40. A hopper assembly 42 is bolted between the lateral spaced side portions of the U-shaped main support frame 40, the hopper assembly 42 including a fertilizer hopper or container 43 with a lower bottom portion having an opening 44 formed therein. It is seen that the hopper 43 is basically a container type structure in that it includes side walls and even a top may also be provided therefor, as suggested in FIG. 2.

Figure 6:
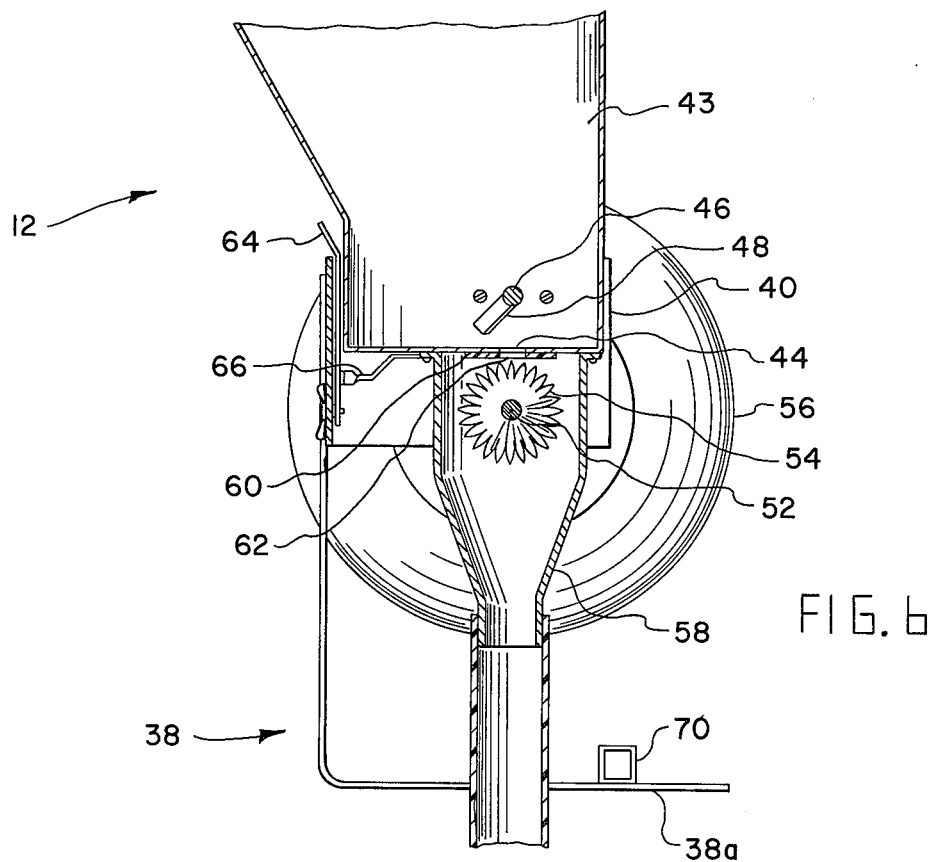
FIG. 6 is a side elevational sectional view of the fertilizer distributor attachment of the present invention taken along the lines 6—6 in FIG. 5.
Figure 7:
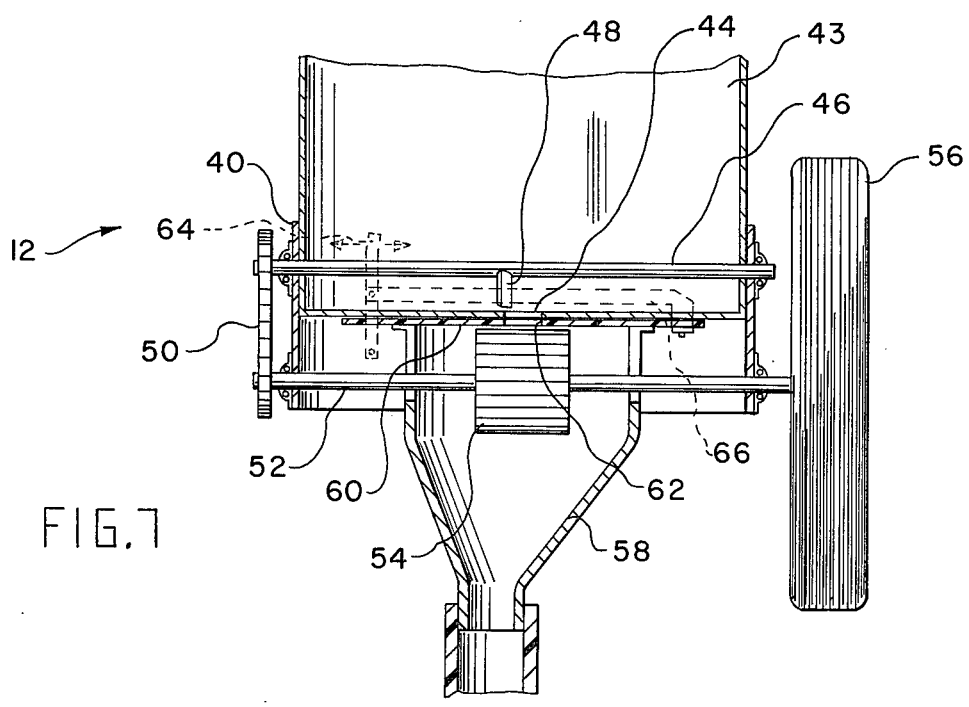
FIG. 7 is also a sectional view of the fertilizer distributor of the present invention taken along the lines 7—7 in FIG. 5 with a flow adjustment shown in phantom.

With reference to FIGS. 6 and 7, it is seen that an agitating shaft 46 is rotatively journaled transversely through the hopper 43 and the U-shaped main frame 40, the shaft being supported adjacent each side of said main support frame 40 in bearings. The agitating shaft 46 is located such that it extends above hopper opening 44 and includes a radial agitating element 48 secured thereto at a point that generally overlies or extends adjacent an area of the hopper opening 44. Secured to one end of shaft 46 outside of support frame 40 is a sprocket 51 that includes a chain 50 trained therearound which leads to another sprocket 53 and is drivingly connected thereto, sprocket 53 being secured to a drive shaft 52 that is rotatively journaled and bearing within the main support frame 40 generally underneath agitating shaft 56 and below the bottom portion of hopper 43, as best seen in FIGS. 6 and 7. Secured generally intermediately between the ends of drive shaft 52 is a flow control wheel sprocket or metering sprocket 54. Metering sprocket 54 is positioned immediately below hopper opening 44 and as drive shaft 52 is driven the metering wheel or sprocket 54 acts to stop or control and distribute fertilizer, soda or other plant growth material passing from the hopper 43 through the hopper opening 44.

Fixed to the end of drive shaft 52 opposite sprocket 53 is a friction drive wheel 56 that is adapted to drive shaft 52 which through sprockets 51 and 53, and chain 50, acts to drive agitating shaft 46. Fertilizer distributor attachment 12, as will be appreciated more from subsequent portions of this disclosure, is particularly adapted to mount to transplanter 10 such that friction drive wheel 56 aligns with and engages the furrow closing wheel means assembly 32 which is rotatively mounted about the main frame 14. Therefore, it is appreciated that the frictional engagement of drive wheel 56 with furrow closing wheel means 32 results in drive shaft 52 being rotatively driven, and consequently the torque thereof is transferred via chain 50 to the agitating shaft 46 and an agitating action may be maintained within the hopper 43 just above the hopper opening 44.

Drive shaft 52 extends through a funnel assembly 58 that is secured to the bottom of the hopper 43 such that the hopper opening 44 and the metering wheel or sprocket 54 is generally enclosed by the funnel assembly. It will be appreciated that in fertilization application that the material of interest, namely, the fertilizer, nitrate of soda, or other material contained within the hopper will be distributed through the tubular extension extending therefrom will direct the material to the desired area of application.

To adjust the rate of application, fertilizer distributor attachment 12 is provided with a flow adjusting plate 60 that includes an opening 62 formed therein. Flow adjustment plate 60 is supported by a slot defined in the upper portion of the funnel assembly directly adjacent the bottom of the hopper 43. The flow adjustment plate is aligned such that the opening 62 formed therein will align with and even coincide with opening 44 formed in the hopper. Moreover, flow adjusting plate 60 is slidably mounted within a slotted area defined in the upper portion of the funnel assembly 58 and can be moved laterally back and forth therein to adjust the effective size of the opening 44 formed within the hopper 43. To provide for this adjustment, a control handle 64 is pivotably mounted about the back of the U-shaped main support frame 40 such that it extends generally between the support frame 40 and the hopper 43. Pivotably connected to the control handle 64 at a point above its pivotable connection point is a connecting link 66 that extends to a point where it connects to the flow adjustment plate 60. The control handle 64 may be provided with a serrated gauge or slot assembly that allows the same to be firmly held in place and also a number of numerical indicia settings may be provided adjacent the handle so as to indicate the effective area of the opening 44 within the bottom of the hopper 43.

With respect to mounting fertilizer distributor attachment 12 to the transplanter 10, in the preferred embodiment illustrated in the drawings, it is noted that main frame 14 of the transplanter 10 includes a rearwardly extending portion that rotatively supports a respective furrow wheel closing assembly 32. This portion of the main frame 14 extending adjacent the furrow closing wheel assembly 32, as viewed in FIG. 1, is particularly shown fragmentarily in FIG. 3 and it is seen that the main frame 14 can be said to include two laterally spaced side members 14a and 14b and a transverse rear support plate 14c extending therebetween about a lower rearward end thereof. To mount the fertilizer distributor attachment 12 of the present invention to the transplanter 10 adjacent a respective furrow closing wheel assembly 32, the lower horizontal leg portion of the mounting frame means 38 is placed between the side members 14a and 14b, as viewed in FIG. 3. When so placed, it is seen that the transverse member or plate 14c serves to generally support the fertilizer distributor attachment 12 and leg 38a of the mounting frame means 38. To hold the fertilizer distributor 12 about the transplanter main frame 14 and to prevent the same from clockwise movement, as viewed in FIG. 1, the mounting frame 38 is provided with connecting means that includes a transverse locking plate 68 that is secured to the front row end of the horizontal leg 38a of the mounting frame means 38 so as to generally extend transversely between and below the two side members 14a and 14b, again as best illustrated in FIG. 3. The presence of the locking plate 68 and the placement of the horizontal leg 38a of the mounting frame means 38 above the transverse member 14c act to support the fertilizer distributor 12 about the transplanter 10. It should be pointed out that the mounting frame means 38 of the fertilizer distributor attachment 12 is so positioned such that when connected to the main frame 14 the friction drive wheel 56 thereof will align with and engage the furrow closing wheel assembly 32, as illustrated in FIG. 1. The engagement of the friction drive wheel 56 with the furrow closing wheel assembly 32 also acts to stabilize and hold the fertilizer distributor attachment about the transplanter main frame 14. In addition, lateral or rocking stability is provided by the provision of a block stabilizer 70 about the top of the horizontal leg 38a of the mounting frame means 38. As seen in FIG. 2 when in the mounted position, the stabilizing block 70 extends between the inner walls of side members 14a and 14b.

Consequently it is seen that to connect and disconnect the fertilizer distributor attachment from the transplanter 10, that the principal operation to be performed is to loosen the bolt or screw that holds the locking plate 68 transversely between and underneath the side members 14a and 14b of the transplanter main frame 14. This allows the mounting frame means or the L-shaped member 38 to be easily and conveniently moved within the main frame and between the side members 14a and 14b in the process of connecting or disconnecting the fertilizer distributor attachment to the transplanter 10.

From the foregoing specification, it is seen that the fertilizer distributor attachment for a mechanical transplanter of the present invention is relatively simple, reliable and relatively inexpensive. Its use in conjunction with a transplanter will enable a farmer to perform both the transplanting operation and the fertilization application in one field operation, thereby avoiding the cost and expense that would be associated with two separate field operations. In addition, the fertilizer distributor attachment 12 of the present invention may be used with other agricultural implements such as a rolling cultivator and may even be used to apply other types of material such as bud worm bait or the like. Finally, the fertilizer distributor attachment of the present invention has the particular advantage of being adaptable to be connected quickly and easily to various kinds of mechanical transplanters in order that the farmer can take advantage of the dual function that the fertilizer distributor attachment of the present invention would provide when used in conjunction with a mechanical transplanter.

The terms "upper", "lower", "forward", "rearward", etc., have been used herein merely for the convenience of the foregoing specification and in the appended claims to describe the fertilizer distributor attachment for a transplanter and its parts as oriented in the drawings. It is to be understood, however, that these terms are in no way limiting to the invention since the fertilizer distributor attachment for a transplanter may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range are intended to be embraced herein.

What is claimed is:

1. A fertilizer distributor attachment adapted to be mounted and powered by a mechanical transplanter of the type having a main frame, plant setting means for depositing plants in an open furrow, and ground engaging furrow closing wheel means rotatively mounted to said main frame, said fertilizer distributor attachment as properly mounted on said transplanter comprising: mounting frame means adapted to be connected to said main frame of said transplanter; support frame means secured to said mounting frame means; a hopper assembly secured to said support frame means and including a lower material distributing opening formed therein and agitating means including at least one shaft extending interiorly through said hopper assembly and rotatively mounted therein; means associated with said hopper assembly for generally directing the flow of material from said hopper to the desired area of application; friction wheel drive means operatively connected to said agitating means and adapted to frictionally engage said furrow covering wheel means when said fertilizer distributor attachment is mounted on said transplanter for driving said agitating means disposed within said hopper assembly in response to said transplanter traversing a field during the transplanting operation, said friction wheel drive means including a drive wheel secured on a drive wheel support shaft supported by said fertilizer distributor attachment and wherein said drive wheel is oriented relative to said mounting frame means of said fertilizer distributor attachment such that said drive wheel is adapted to align with and frictionally engage said furrow wheel closing means of said transplanter when said fertilizer distributor attachment is properly mounted on said transplanter; and interconnecting drive means operatively interconnected between said friction wheel drive means and said agitating means for driving said agitating means in response to said drive wheel of said friction wheel drive means being driven.

2. The fertilizer distributor attachment of claim 1 wherein said mounting frame means includes a generally L-shaped mounting arm and connecting means for connecting one end of said L-shaped mounting arm to said main frame of said transplanters; and wherein said support frame means of said fertilizer distributor attachment includes a generally U-shaped support structure having a back portion and a pair of laterally spaced end portions extending generally perpendicular therefrom, said end portions being disposed in generally laterally spaced vertical planes and adapted to support and at least partially encompass said hopper assembly and said drive means associated therewith.

3. The fertilizer distributor attachment of claim 2 wherein said main frame of said transplanter forms a part of said connecting means includes a pair of laterally spaced side members and a transverse support plate extending between said side members; and wherein in attaching said fertilizer distributor attachment to said transplanter one end of said L-shaped member is placed above said transverse plate and between said laterally spaced side members of said main frame and wherein said connecting means further includes a locking plate secured to said one end of said L-shaped member and normally extending transversely below and across said pair of laterally spaced side members such that said locking plate acts to generally limit rotative movement of said fertilizer distributor attachment in one direction while the engaging of said drive wheel with said furrow closing wheel means generally prohibits rotative movement of said fertilizer distributor attachment in a counter direction.

4. The fertilizer distributor attachment of claim 3 wherein said L-shaped member includes a stabilizing member secured thereto and extending transversely thereacross so as to extend between said laterally spaced side members of said main frame when said fertilizer distributor attachment is secured on said transplanter.

* * * * *